United States Patent

[11] 3,634,182

[72] Inventors Duane O. Biglin;
Jerome R. Grothjan, both of Toledo, Ohio
[21] Appl. No. 862,142
[22] Filed Aug. 20, 1969
[45] Patented Jan. 11, 1972
[73] Assignee Owens-Illinois, Inc.
Original application Mar. 16, 1967, Ser. No. 623,679, now Patent No. 3,488,805. Divided and this application Aug. 20, 1969, Ser. No. 862,142

[54] PREFORMED PLASTIC BLANK FOR MAKING OPEN MOUTH PLASTIC CONTAINERS
3 Claims, 9 Drawing Figs.

[52] U.S. Cl. .................................................. 161/42,
161/118, 161/165, 220/62, 220/74, 264/323, 264/328
[51] Int. Cl. .................................................. B32b 3/02
[50] Field of Search .................................................. 161/42, 44,
116, 118, 124, 126, 165; 264/323, 328; 18/5 BJ, 5 BM, 5 BP; 220/62, 73, 74

[56] References Cited
UNITED STATES PATENTS
| | | | |
|---|---|---|---|
| 3,184,524 | 5/1965 | Whiteford | 264/323 UX |
| 3,298,893 | 1/1967 | Allen | 161/42 |
| 3,341,644 | 9/1967 | Allen | 264/328 X |
| 3,471,896 | 10/1969 | Ninneman | 18/5 BM |

Primary Examiner—Philip Dier
Attorneys—Philip M. Rice and W. A. Schaich

ABSTRACT: In apparatus for forming a thermoplastic parison having a rim portion encircling a central portion capable of subsequent deformation, the improvement of mold means contoured to retain thermoplastic material in the rim cavity to control the dimensions of the rim by preventing its shrinking away from the wall of the rim cavity upon cooling. The parison produced by such apparatus has a central bottom wall and a sidewall forming portion and a rim portion joined thereto by a thin web of material.

PATENTED JAN 11 1972 3,634,182
SHEET 1 OF 3
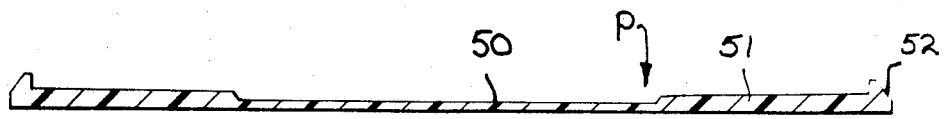
FIG. 8    PRIOR ART· BEFORE COOLING
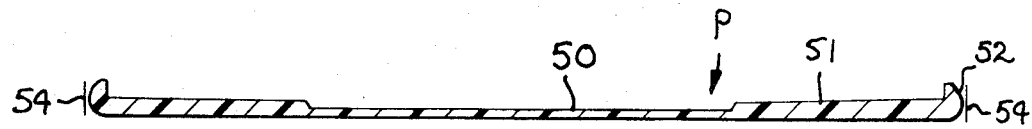
FIG. 8A   PRIOR ART·AFTER COOLING
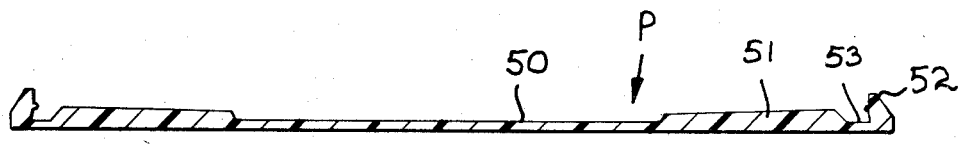
FIG. 9
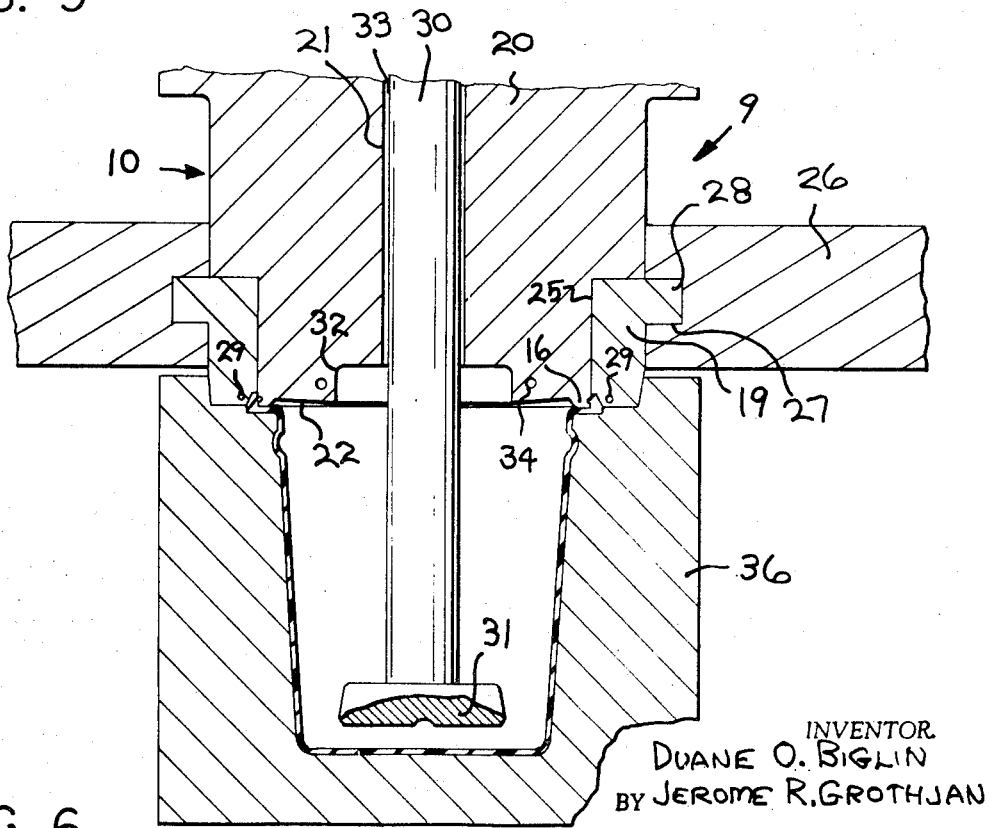
FIG. 6
INVENTOR
DUANE O. BIGLIN
BY JEROME R. GROTHJAN
ATTORNEYS

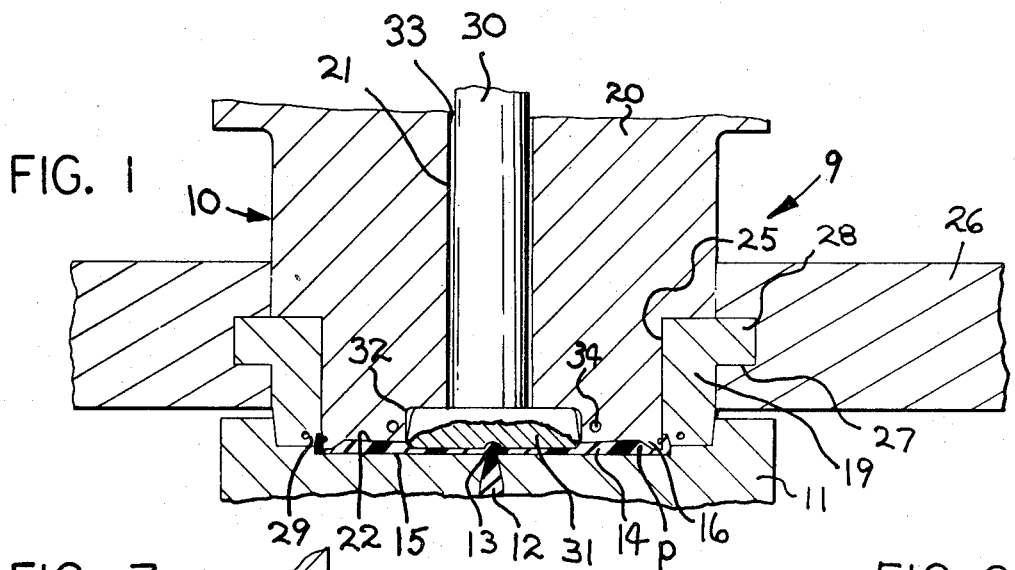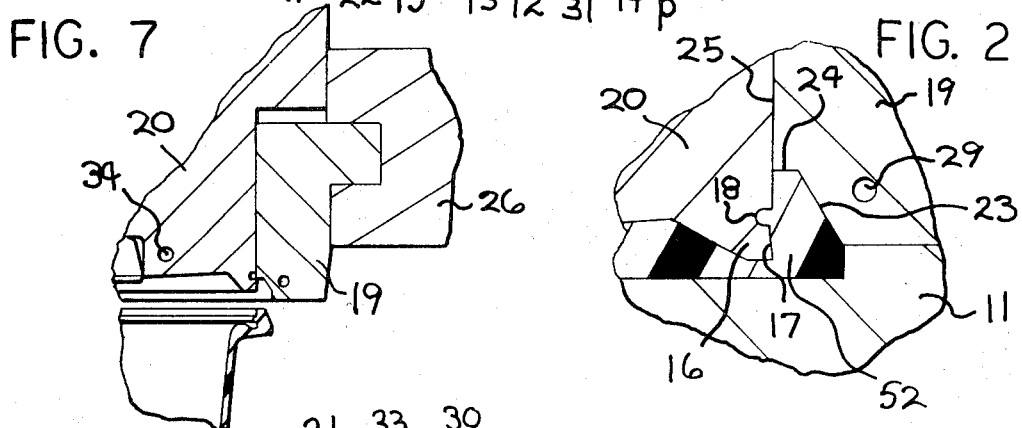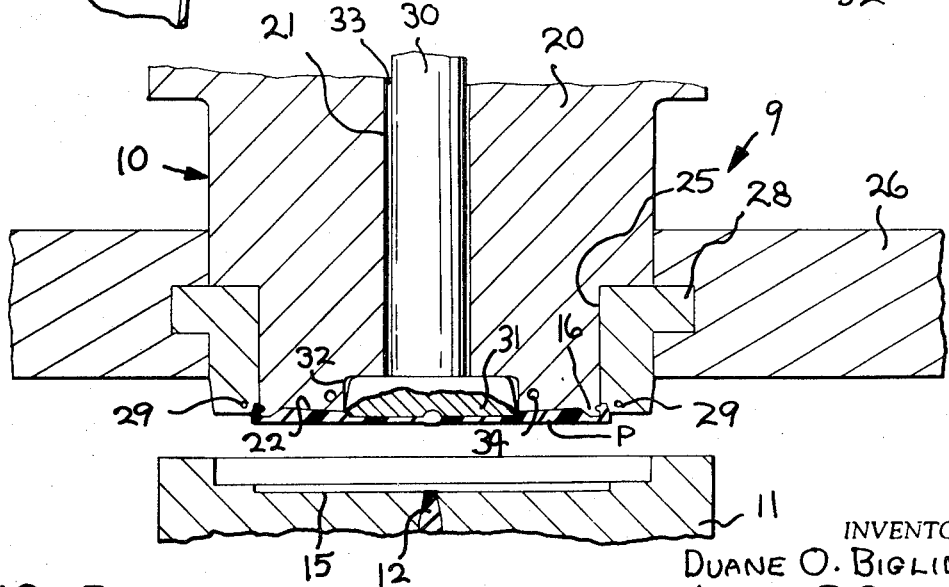

PREFORMED PLASTIC BLANK FOR MAKING OPEN MOUTH PLASTIC CONTAINERS

This is a division of application Ser. No. 623,679, filed Mar. 16, 1967 now U.S. Pat. No. 3,488,805.

BACKGROUND OF THE INVENTION

It is generally known to form a plastic container by a method wherein a substantially planar parison is injection molded in an injection mold cavity and is then carried by part of the injection mold to a blow mold where such parison is pressure formed into an article whose exterior surface conforms to the mold cavity. Such a process is disclosed in Canadian Pat. No. 730,061, issued Mar. 15, 1966.

Difficulties have been encountered in such process in maintaining the rim portion to precisely the desired contour. An accurately contoured rim portion is necessary to insure that a closure designed for such container will sealingly engage such rim. The difficulty in maintaining the contour of the rim during forming arises in large measure from cooling of the parison between the time it is injection molded from heated thermoplastic material until the time it is molded to its final configuration. Such cooling causes the parison to shrink, pulling the rim portion radially inwardly away from the rim molding surface thereby causing the rim portion of the finished article to be out of the desired contour.

It is an object of the present invention to provide apparatus for forming a parison adapted to subsequently be molded into a cup-shaped container having a precisely contoured rim portion.

It is a further object of the present invention to provide apparatus for injection molding a parison having a rim, which apparatus is characterized by the feature of a mold portion which securely holds the rim portion thereof to substantially the contour of the mold during cooling.

A further object of the present invention is to provide a parison having a precisely formed rim portion, which parison can be subsequently deformed into a cup-shaped container having a precisely contoured rim portion.

Other objects and advantages of the present invention will become readily apparent to those skilled in the art from the following detailed description taken in conjunction with the annexed sheets of drawings on which:

FIG. 1 is a vertical sectional view showing the apparatus of the present invention upon completion of injection molding a parison.

FIG. 2 is an enlarged fragmentary view of a portion of the apparatus shown in FIG. 1.

FIGS. 3-6 are vertical sectional views illustrating the steps in the forming of a cup-shaped container from the injection molded parison.

FIG. 7 is an enlarged fragmentary view showing the finished container after removal from the blow mold while it is being stripped or ejected from the injection mold-half carrying it.

FIG. 8 is an enlarged sectional view showing the desired configuration of a prior art parison.

FIG. 8A is a view similar to FIG. 8 showing, after cooling, a parison formed in a mold having a cavity conforming to the configuration shown in FIG. 8.

FIG. 9 is an enlarged sectional view of a parison formed according to the present invention.

Figure 4:
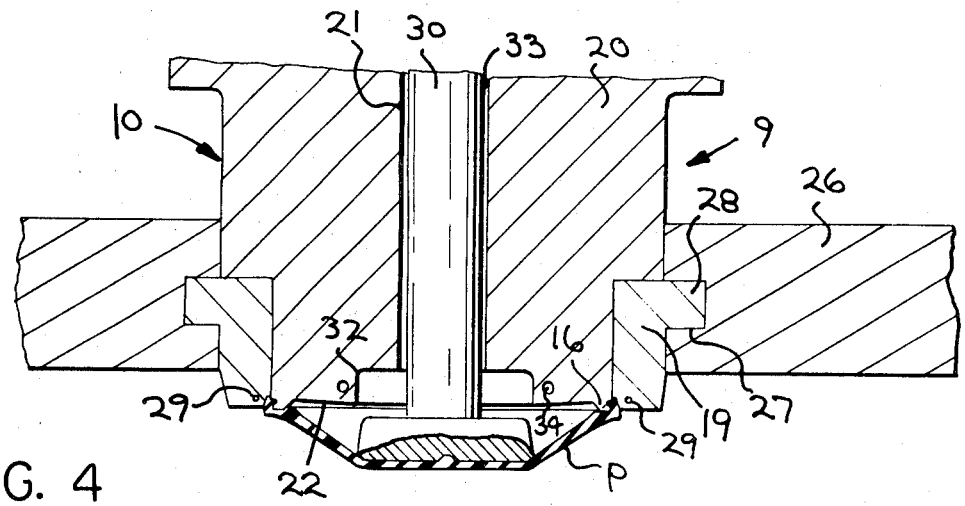

Referring now to the drawings, there is provided an injection mold generally designated by the numeral 9 comprising a lower injection block 11 having a supply channel 12 therein adapted to receive plasticized thermoplastic material from a suitable source, as from a conventional plasticizer-extruder. The supply channel 12 terminates in an upper reduced orifice 13 from which the plasticized material flows into an injection mold cavity 14. The injection mold cavity 14 is defined between the upper planar surface 15 of the block 11 and an upper injection mold assembly indicated generally by the numeral 10 and is adapted to have molded therein a parison P. As may be seen from FIG. 9, the parison P includes a central planar portion 50 encircled by a sidewall molding portion 51 which is frustoconical in shape. Radially outwardly from the sidewall molding portion 51 is an annular rim portion 52 joined to said sidewall molding portion 51 by a web portion 53 which is substantially thinner in cross section than said sidewall molding portion 51.

The upper injection mold assembly 10 includes ring element 19 which is annular in shape and which receives therein a central mold element 20 having an internal bore 21. The central mold element 20 is snugly but slidably received in the ring element 19, with a sidewall portion 25 of the central mold element 20 contacting the ring element 19. The central mold element 20 terminates at its lower end in a parison sidewall molding surface 22 which is frustoconical in shape and which cooperates with the upper planar surface 15 of the lower injection block 11 to define a gap which is relatively thin toward the central axis and becomes somewhat thicker radially outwardly therefrom.

Radially outwardly from the parison sidewall molding surface is a downwardly extending annular lip 16 which forms the upper surface of the web portion 53. The outer periphery of the annular lip may taper slightly inwardly and upwardly as at 17 (FIG. 2) and may have an annular groove 18 formed therein which serves to aid in retaining the parison P on the lower end of the central mold element 20.

The ring element 19 has a notch at the inner corner facing the lower injection block 11. The notch is defined by an inwardly facing wall portion 23 and a downwardly facing wall portion 24 which cooperate with the wall portions 17 and 25 of the central mold element 20 to define the rim cavity in which the rim portion 52 is formed. Additionally, the ring element 19 has a cooling passage 29 formed therein to aid in cooling and setting the rim portion 52.

The purpose of the downwardly extending annular lip 16 is to retain thermoplastic material in the rim cavity and thereby prevent its shrinking and pulling radially inwardly upon cooling. Additionally, the annular lip 16 serves to partially isolate the thermoplastic material in the rim cavity from that in the remainder of the mold cavity 14 thereby permitting the material in such rim cavity to be cooled without excessively cooling the other portions of parison P. The lip 16 should be spaced from the planar surface 15 sufficiently far to permit the thermoplastic material to flow completely into the rim cavity and yet sufficiently close to accomplish the above objectives. Spacing on the order of 0.030 inch has proven satisfactory. Such spacing, of course, determines the thickness of the parison web portion 53 which would also be on the order of 0.030 inch. The thickness of the web portion is 53 is less than one half the thickness of the sidewall forming portion 51 adjacent thereunder. FIGS. 8 and 8A, labeled PRIOR ART, illustrate the change in contour that takes place in parisons molded prior to the present invention. Thus, when initially molded, the parison P conforms precisely to the design configuration as shown in FIG. 8. However, upon cooling, the parison P shrinks causing the outer corner of the rim 52 to pull in severely from its original maximum diameter as illustrated by the numeral 54 in FIG. 8A. FIG. 9 shows a parison formed in accordance with the present invention both before and after cooling.

Referring again to FIG. 1, movement of the ring element 19 relative to the central mold element 20 is effected by means of a carrying member 26 having a groove 27 in which a radially outwardly projecting flange 28 of ring element 19 is received. Any desired power means may be utilized for moving the carrying member 26 and, thus, the ring element 19 axially with respect to the central mold element 20. It may be readily appreciated that movement of the ring element 19 downwardly with respect to the central mold element 20 will serve to strip or eject an article therefrom. The central mold portion 20 is provided with a passage 34 through which a heating medium may be circulated to assist in maintaining the sidewall forming portion 51 of the parison P in a condition of plasticity.

Positioned in the bore 21 of the central mold element 20 is a vertically reciprocable piston rod 30 carrying on the free end thereof a circular disclike element or plunger 31. When retracted, as during the injection molding step illustrated in FIG. 1, the plunger 31 is positioned in a recess 32 formed in the lower end of the central mold element 20. The lower face of the plunger 31 cooperates with the upper planar surface 15 to define the central planar portion 50 of the parison which will be the bottom of the finished container.

Figure 5:
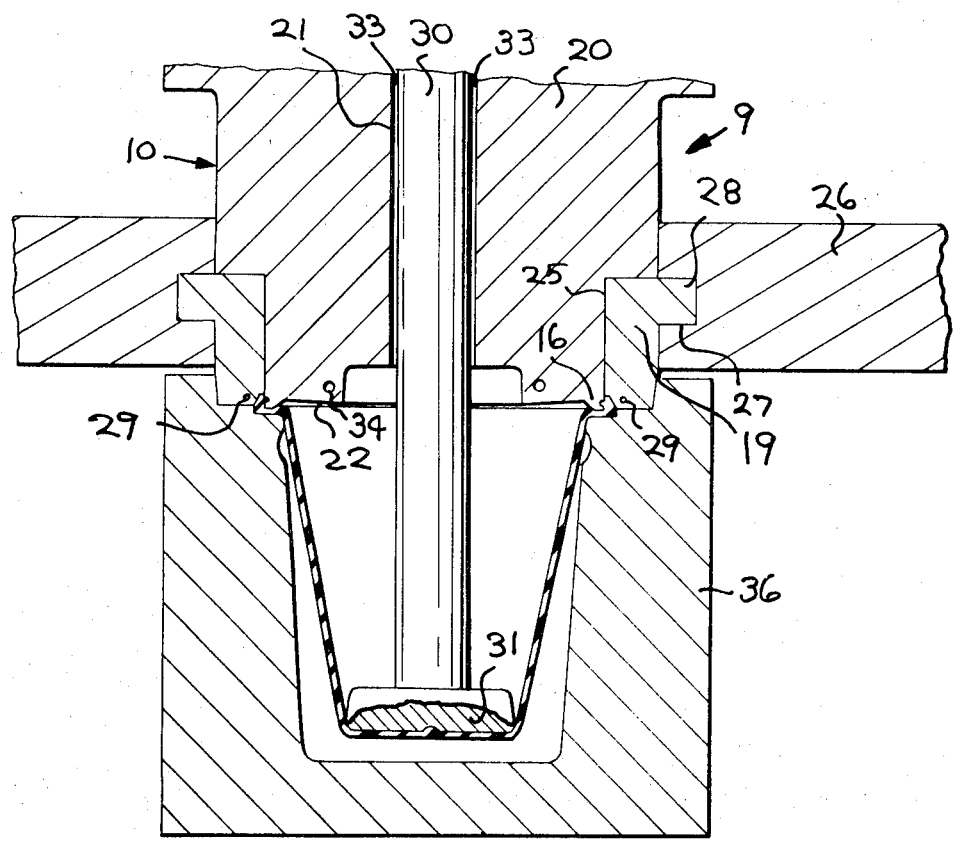

The piston rod 30 is spaced from the wall of the bore 21 to provide an annular passageway 33 through which pressured fluid may be introduced to expand the stretched parison into conformity with the molding cavity of a blow mold 36 (see FIGS. 5 and 6).

In operation, the upper mold assembly 10 is positioned against the lower injection block 11 and heated thermoplastic material is injection molded in the cavity 14 through the supply channel 12.

The injection molding step results in the plasticized material completely filling the cavity including the rim-defining portion thereof to form the substantially flat disclike parison P. Upon completion of the injection molding step, a cooling medium is introduced through passageway 29 to cause the thermoplastic material forming the rim 52 to become substantially set. Thereafter, the upper mold assembly 10 is lifted by any desired power means from the lower injection block 11 (FIG. 3) and transferred to the blow mold 36 (FIG. 5). The upper mold assembly 10 carries with it the injection molded parison P which is held thereon by virtue of the rim portion engaged in the rim cavity.

Upon disengagement of the upper mold assembly from the lower injection block 11, the plunger 31 is partially extended to urge the parison P out of contact with the molding surface 22 (FIG. 4).

Thereafter, as illustrated in FIGS. 5 and 6, the upper mold assembly 10 carrying the partially deformed parison is positioned on the blow mold 36 and pressured fluid is introduced through the passageway 33 to expand the parison into conformity with the cavity of the blow mold. Upon completion of the blowing step, the upper mold assembly 10 is raised to remove the container from the blow mold. The carrying member 26 is then urged downwardly (FIG. 7) carrying the ring element 19 therewith, moving it relative to the central mold element 20 to strip or eject the formed container therefrom.

It will be readily seen from the foregoing that the present invention provides apparatus capable of forming containers much more efficiently and with a much more precisely formed rim portion than was heretofore possible.

It should be recognized that although the present invention has been described in an operation wherein the finished container is formed, for some operations it may be desirable to supply the parison itself as an article to a blow molder who subsequently deforms it to the desired shape. In that event, the passage 34 may be used for cooling rather than heating. In either event, the necessity of maintaining a precisely contoured rim portion will be appreciated.

Numerous modifications will become readily apparent to those skilled in the art. Accordingly, the true scope of the invention is defined in the following claims.

We claim:

1. A preformed plastic blank for making open mouth plastic containers, said plastic blank being substantially planar and having a circular planar central portion for forming the bottom wall of the container, said central bottom wall forming portion of said blank being of approximately the thickness of the bottom wall of the finished container, said plastic blank having an annular sidewall forming portion for the container surrounding and integral with the outer periphery of said bottom wall forming portion, said sidewall forming portion being of a thickness greater than the thickness of said bottom wall portion to permit stretching and thinning of the sidewall portion of the blank to generally cup-shaped form, a rim portion radially outwardly of said annular sidewall forming portion and of a cross section and outline of substantially the rim of the finished container and a web portion joining said rim portion to said sidewall forming portion, said web portion being thinner than any part of said sidewall forming portion.

2. The blank as set forth in claim 1 wherein the thickness of said web portion is less than one-half the thickness of the sidewall forming portion adjacent thereto.

3. The blank as set forth in claim 1 wherein the thickness of said web portion is approximately 0.030 inch.

* * * * *